(12) United States Patent
Chang et al.

(10) Patent No.: US 7,634,192 B2
(45) Date of Patent: Dec. 15, 2009

(54) POWER CONNECTION DEVICE FOR A FLASH TUBE AND A CAMERA MODULE

(75) Inventors: Feng Chang, Hsinchu (TW); Chih-Shen Lin, Hsinchu (TW)

(73) Assignee: Altek Corporation, Hsinchu (TW)

( * ) Notice: Subject to any disclaimer, the term of this patent is extended or adjusted under 35 U.S.C. 154(b) by 435 days.

(21) Appl. No.: 11/498,889

(22) Filed: Aug. 4, 2006

(65) Prior Publication Data

US 2007/0248347 A1      Oct. 25, 2007

(30) Foreign Application Priority Data

Apr. 21, 2006     (TW) .............................. 95206865 U

(51) Int. Cl.
*G03B 15/03*          (2006.01)
(52) U.S. Cl. ....................... 396/155; 396/176; 396/177
(58) Field of Classification Search ................ 396/155, 396/176, 439, 129, 177, 178; 348/372
See application file for complete search history.

(56) References Cited

U.S. PATENT DOCUMENTS

| | | | | |
|---|---|---|---|---|
| 3,855,495 A | * | 12/1974 | Pappas et al. | 313/318.08 |
| 4,130,774 A | * | 12/1978 | Cosco et al. | 313/318.08 |
| 5,149,281 A | * | 9/1992 | Hills et al. | 439/521 |
| 5,651,601 A | * | 7/1997 | Morisawa | 362/16 |
| 5,785,543 A | * | 7/1998 | Dietrich | 439/271 |
| 5,913,083 A | * | 6/1999 | Allen | 396/176 |
| 6,470,145 B1 | * | 10/2002 | Matthias et al. | 396/6 |
| 6,709,120 B2 | * | 3/2004 | Lu et al. | 362/16 |

* cited by examiner

*Primary Examiner*—Melissa J Koval
*Assistant Examiner*—Warren K Fenwick
(74) *Attorney, Agent, or Firm*—Rosenberg, Klein & Lee

(57) ABSTRACT

A power connection device for connecting a flash tube and a camera module includes a wire, a first electrical connector, and a second electrical connector. One end of the wire is connected with the flash tube, and the first electrical connector is electrically connected with the other end of the wire. The second electrical connector is located at a power supply terminal of the camera module and the second electrical connector is electrically plugged with the first electrical connector. Thereby, the flash tube is connected with the camera module via the power connection device.

6 Claims, 4 Drawing Sheets

POWER CONNECTION DEVICE FOR A FLASH TUBE AND A CAMERA MODULE

BACKGROUND OF THE INVENTION

1. Field of the Invention

The present invention relates to a power connection device. In particular, this invention relates to a power connection device for connecting a flash tube and a camera module.

2. Description of the Related Art

As consumer electronic products have developed, a lot of devices (such as cell phone cameras, PDAs, and smart phones, etc.) include a camera module that allows users take photos. In order to enhance the quality of photos, a flash tube is added to the devices to compensate for inadequate lighting. Other camera devices, such as conventional still cameras, digital still cameras, or digital cameras, also make use of the flash tube.

However, the power connection between the flash tube and the camera module is usually implemented by a flexible flake or a wire and a welding process. Because the power connection needs a strong structure, these two methods adopt multiple welding processes that consume a large amount of time to be completed. Furthermore, when the welded process is being performed, the flash tube is easily overheated, damaging the flash tube.

When the power connection between the flash tube and the camera module usually is implemented via a wire and a welding process, a process of spotting glue to fully wrap the welding points is necessary. Therefore, when the flash tube is used, the problem of jump spark affecting the operation of the camera module is avoided. FIG. 1 is a schematic diagram of the flash tube connected with a camera module of the prior art. Two ends of the flash tube 100 are electrically connected with wires 3. Another end of the wire 3 is connected with the power supply terminal 201 of the camera module 200 via a process of welding tin on the welding points 40. The welding points 40 is wrapped with insulating glue 60 to prevent the jump spark from occurring when the flash tube is used.

In the manufacturing process of devices adopting the prior art, multiple welding processes are needed. Therefore, a lot of problems may occur due to artificial factors.

SUMMARY OF THE INVENTION

One particular aspect of the present invention utilizes a wire to connect a flash tube with a camera module. One end of the wire is connected with the flash tube, and another end of the wire has an electrical connector and is connected with a corresponding electrical connector located on the camera module. Therefore, the goals of reducing the time required for the welding processes, reducing the manpower required, and increasing the yield rate are achieved.

The present invention provides a power connection device for connecting a flash tube and a camera module. The power connection device for connecting a flash tube and a camera module includes a wire, a first electrical connector, and a second electrical connector. The first electrical connector further includes a first electrical connector shell and a first conducting part. The second electrical connector further includes a second electrical connector shell and a second conducting part. One end of the wire is connected with the flash tube, and another end of the wire is connected with the first electrical connector. Next, the first electrical connector is electrically plugged into the second electrical connector located at a power supply terminal of the camera module. Thereby, the flash tube is connected with the power source of the camera module via the wire, the first electrical connector, and the second electrical connector.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
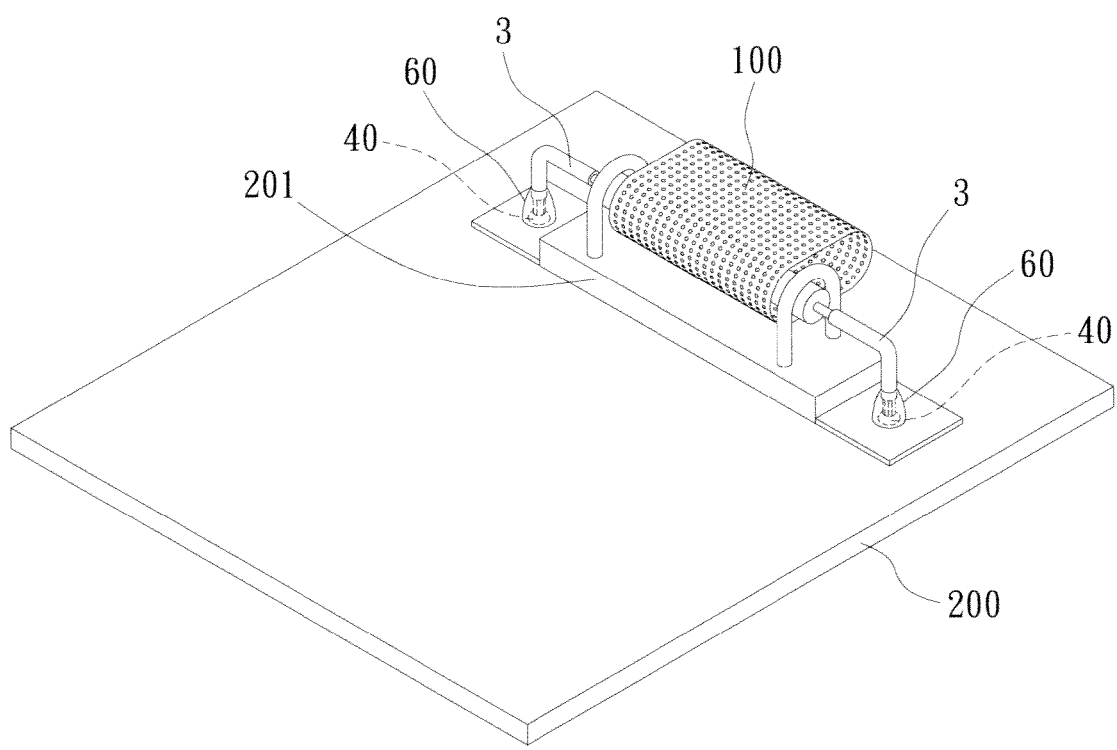
FIG. 1 is a schematic diagram of the flash tube connecting with a camera module of the prior art.
Figure 2A:
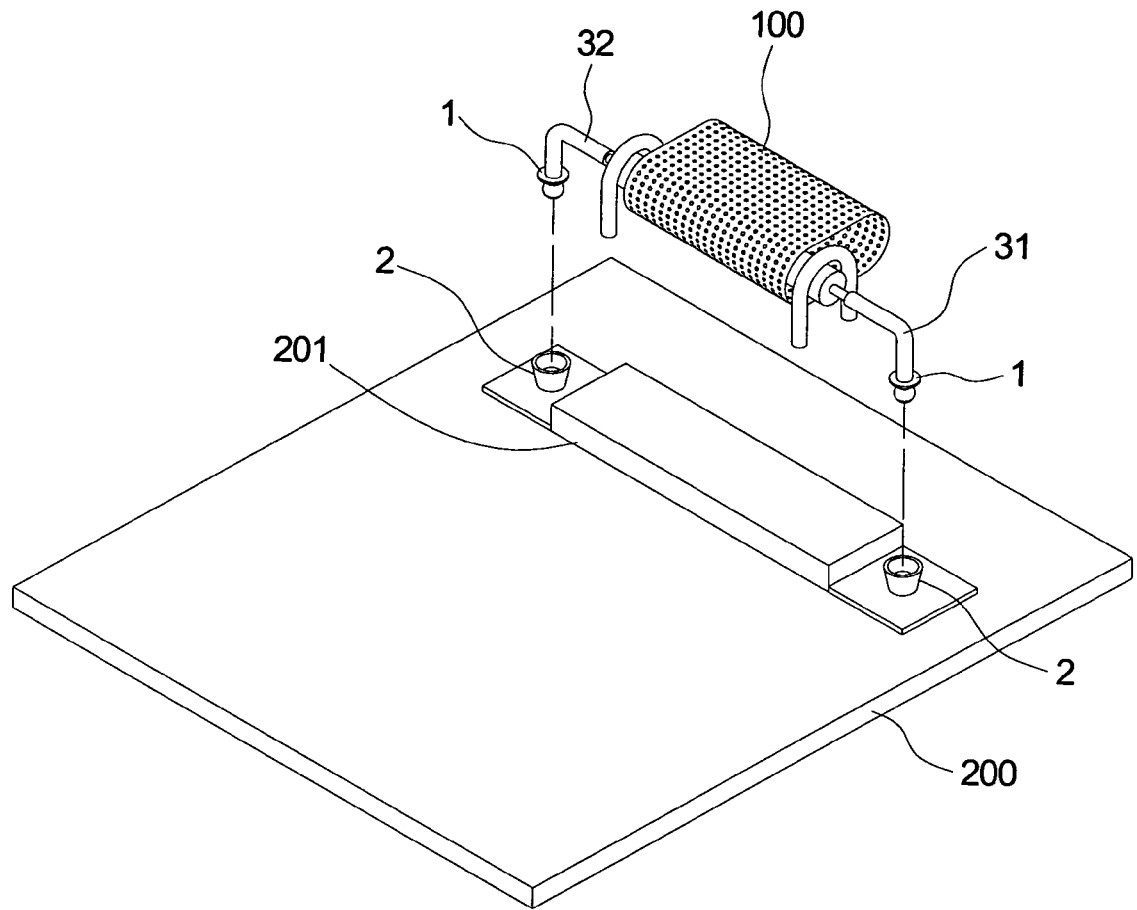
FIG. 2A is a schematic diagram of the flash tube not plugged into a camera module of the present invention.
Figure 2B:
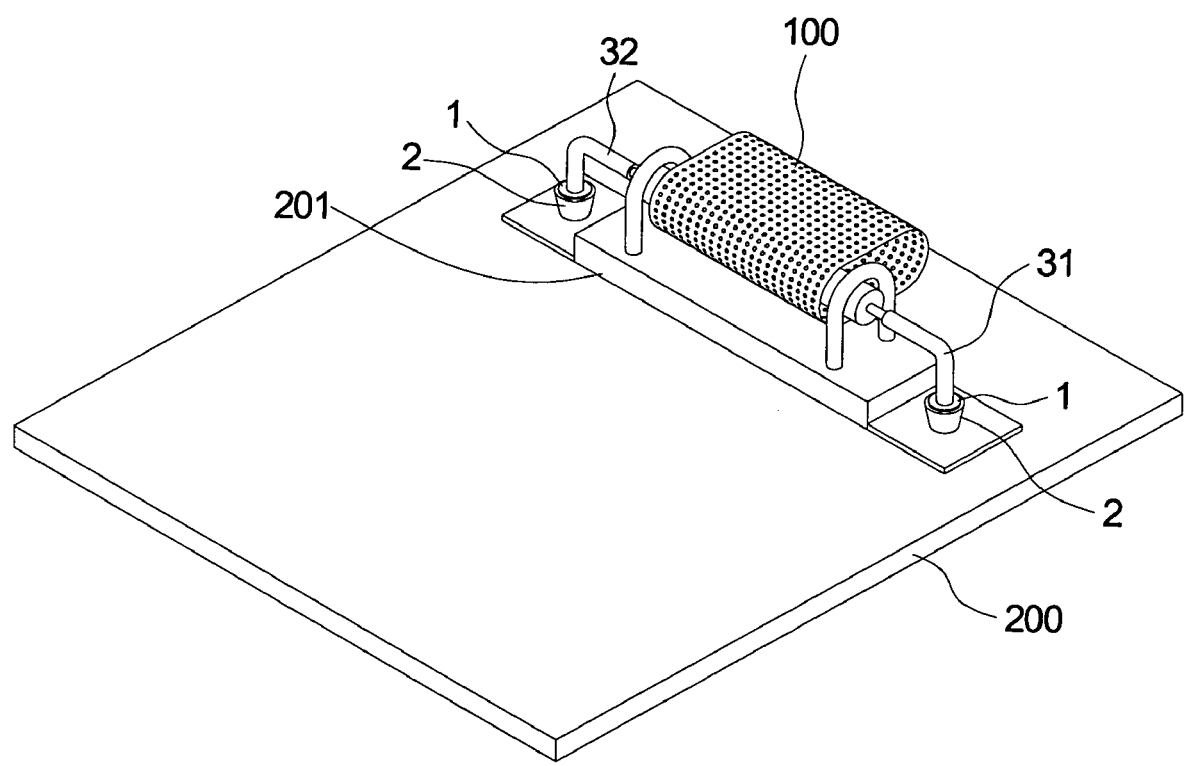
FIG. 2B is a schematic diagram of the flash tube plugged into a camera module of the present invention.

Reference is made to FIGS. 2A and 2B, which show a schematic diagram of the flash tube not plugged into a camera module of the present invention and a schematic diagram of the flash tube plugged into a camera module of the present invention. The present invention provides a power connection device for connecting the flash tube 100 with a camera module 200. One end of the first wire 31 and the second wire 32 are individually and electrically connected with the two ends of the flash tube 100 via a welding method. The first wire 31 and the second wire 32 are made of anti-high-voltage material for sustaining the desired high voltage for the flash tube 100. Another end of the first wire 31 and the second wire 32 are individually connected with a first electrical connector 1. When the power connection device is assembled, the first electrical connectors 1 are individually connected with the second electrical connectors 2 located at the power supply terminal 201 of the camera module 200. Thereby, the flash tube 100 is electrically connected with the power source of the camera module 200 by connecting the first wire 31 and the second wire 32 with the first electrical connector and electrically plugging the first electrical connector 1 into the second electrical connector 2. Therefore, the flash tube 100 obtains power from the power supply terminal 201 to perform the flash function.

Figure 3:
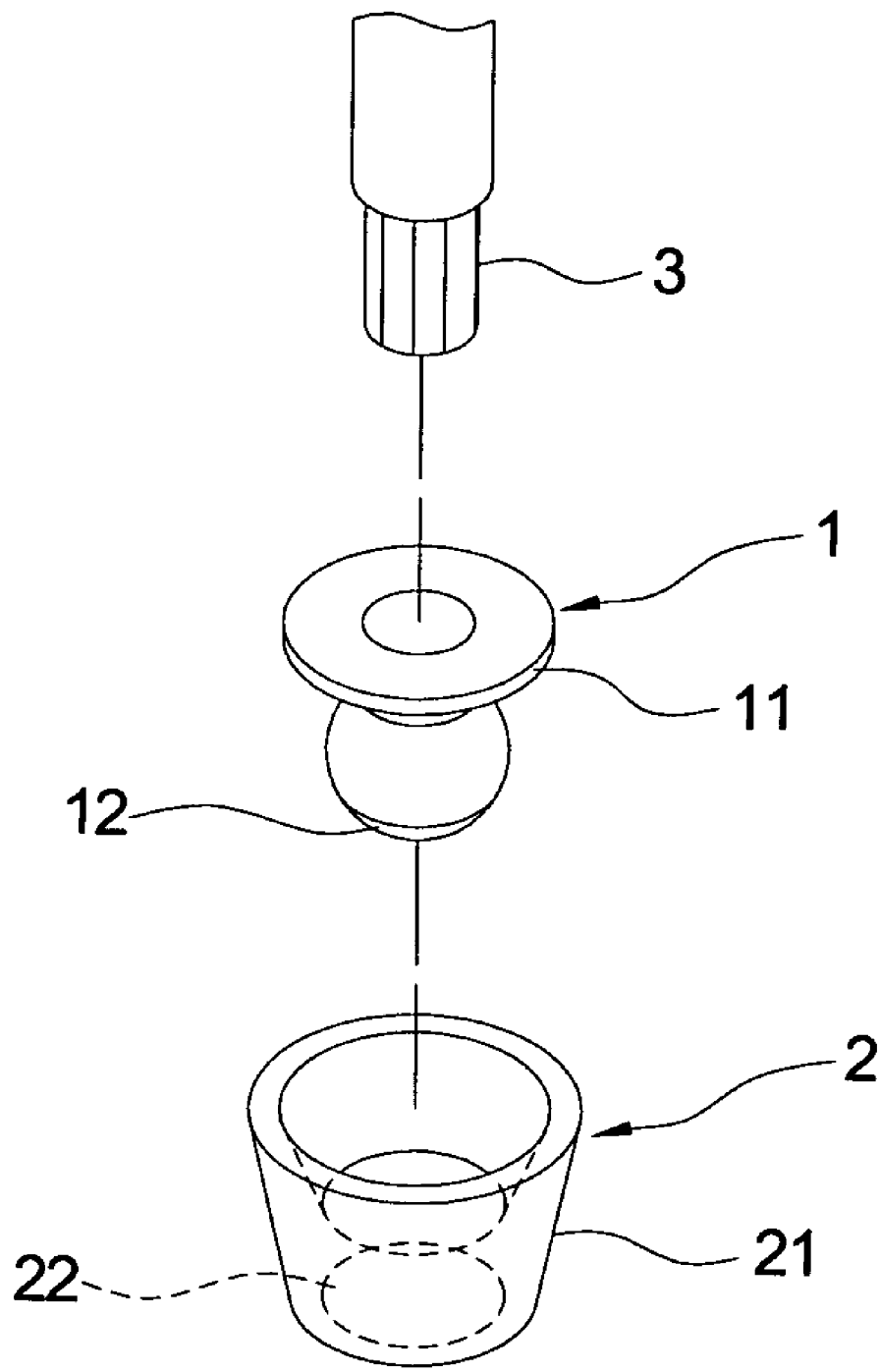
FIG. 3 is an exploded perspective view of a preferred embodiment of the power connection device for connecting a flash tube and a camera module of the present invention.

FIG. 3 shows an exploded perspective view of a preferred embodiment of the power connection device for connecting a flash tube and a camera module of the present invention. The present invention provides a power connection device for connecting the flash tube 100 with the camera module 200. The power connection device includes a wire 3, a first electrical connector 1, and a second electrical connector 2. One end of the wire 31 is electrically connected with the flash tube 100 via a welding method. The wire 3 is made of anti-high-voltage material for sustaining the desired high voltage for the flash tube 100. The first electrical connector 1 further includes a first electrical connector shell 11 and a first conducting part 12. The first electrical connector shell 11 is electrically connected with the other end of the wire 3 via a welding method. The first conducting part 12 is connected with the inner part of the first electrical connector shell 11. The first electrical connector shell 11 is made of non-conducting material. The first electrical connector 1 is electrically connected with the wire 3 via the first conducting part 12. The second electrical connector 2 further includes a second electrical connector shell 21 and a second conducting part 22. The second electrical connector shell 21 is made of non-conducting material. The second conducting part 22 is connected with the inner part of the second electrical connector shell 21. The second electrical connector 2 is electrically connected with the power supply terminal 201 of the camera module 200 via the second conducting part 22. Thereby, by plugging the first electrical connector shell 11 of the first electrical connector 1 into the second electrical connector shell 21 of the second electrical connector 2, the first conducting part 12 contacts the second conducting part 22 so as to form an electrical connection. Therefore, the first electrical connector 1 is electrically plugged into and connected with the second electrical connector 2. The flash tube 100 is electrically connected with the power supply terminal 201 of the camera module 200 by electrically connecting the wire with the first electrical connector 1 and electrically plugging the first electrical connector 1 into the second electrical connector 2. The flash tube 100 obtains power from the power supply terminal 201 to perform the flash function.

The appearance of the first electrical connector 1 and the second electrical connector 2 is not used to restrict the connection method between the flash tube 100 and the power supply terminal 201 of the camera module 200.

By this method, the present invention achieves the goals of reducing the time required for the welding processes, reducing the manpower required, and increasing the yield rate by connecting the first electrical connector 1 with the second electrical connector 2. The present invention also has the following further characteristics:

1. Damage to the flash tube 100 is reduced. By connecting the first electrical connector 1 with the second electrical connector 2 the problem of the flash tube 100 being damaged due high temperatures or artificial factors when the flash tube 100 is welded is eliminated.

2. Production efficiency is increased. By reducing the time required for the welding process and the glue-spotting process, the checking points for the welding process and the glue-spotting process are not required. A normal manufacturing process can be executed instead which increases production efficiency.

3. It is easy to maintain and replace the flash tube. When the flash tube 100 needs to be replaced or maintained, the processes of removing the insulating glue and welding tin on the welding points can be omitted. The connecting method of the present invention shortens time required for maintenance.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A power connection device for connecting a flash tube and a camera module, comprising:
    a wire, wherein one end of the wire is connected with one of two ends of the flash tube via a welding process;
    a first electrical connector electrically connected with another end of the wire; and
    a second electrical connector located at one power supply terminal of the camera module;
    wherein the first electrical connector is directly pluggable and unpluggable to the second electrical connector.

2. The power connection device for connecting a flash tube and a camera module as claimed in claim 1, wherein the wire is made of anti-high-voltage material.

3. The power connection device for connecting a flash tube and a camera module as claimed in claim 1, wherein the first electrical connector further includes a first electrical connector shell and a first conducting part, the first conducting part is located in the first electrical connector shell, and the first conducting part is electrically connected with the wire.

4. The power connection device for connecting a flash tube and a camera module as claimed in claim 3, wherein the first electrical connector shell is made of non-conducting material.

5. The power connection device for connecting a flash tube and a camera module as claimed in claim 3, wherein the second electrical connector further includes a second electrical connector shell and a second conducting part, the second conducting part is located in the second electrical connector shell, and the second conducting part is electrically connected with the power supply terminal, and when the second electrical connector shell is plugged into the first electrical connector shell, the first conducting part electrically contacts the second conducting part.

6. The power connection device for connecting a flash tube and a camera module as claimed in claim 5, wherein the second electrical connector shell is made of non-conducting material.

* * * * *